United States Patent [19]
Kato

[11] 3,874,071

[45] Apr. 1, 1975

[54] MACHINE TOOL WITH AUTOMATIC TOOL CHANGING DEVICE

[75] Inventor: Sadamu Kato, Takahama, Japan

[73] Assignee: Toyoda Koki Kabushiki Kaisha, Kariya-shi, Aichi-ken, Japan

[22] Filed: Feb. 23, 1973

[21] Appl. No.: 335,094

[30] Foreign Application Priority Data
Feb. 25, 1972 Japan.............................. 47-19941

[52] U.S. Cl. .............................................. 29/568
[51] Int. Cl. .............................................. B23q 3/157
[58] Field of Search............................ 29/568, 26 A

[56] References Cited
UNITED STATES PATENTS
3,691,655 9/1972 Kurimoto et al...................... 29/568
3,791,022 2/1974 Kurimoto et al...................... 29/568

Primary Examiner—Andrew R. Juhasz
Assistant Examiner—Z. R. Bilinsky
Attorney, Agent, or Firm—Oblon, Fisher, Spivak, McClelland & Maier

[57] ABSTRACT

A machine tool having an automatic tool changing device includes a tool magazine upon which a plurality of cutting tools, having recesses for engaging drive keys upon a drive spindle, are mounted, a spindle head mounting the drive spindle which can be rotationally stopped by a braking device, first detecting means which detects the angular position of the stopped drive spindle, second detecting means which detects the angular position of a tool to be used for a subsequent machining operation and which is supported upon an arm device, and control means which serves to rotate the tool upon the arm device in accordance with the differential between output signals of the first and second detecting means so as to attain the desired tool exchanging operation through engagement of the drive keys upon the drive spindle and the recesses upon the tool being exchanged and inserted within the drive spindle.

5 Claims, 5 Drawing Figures

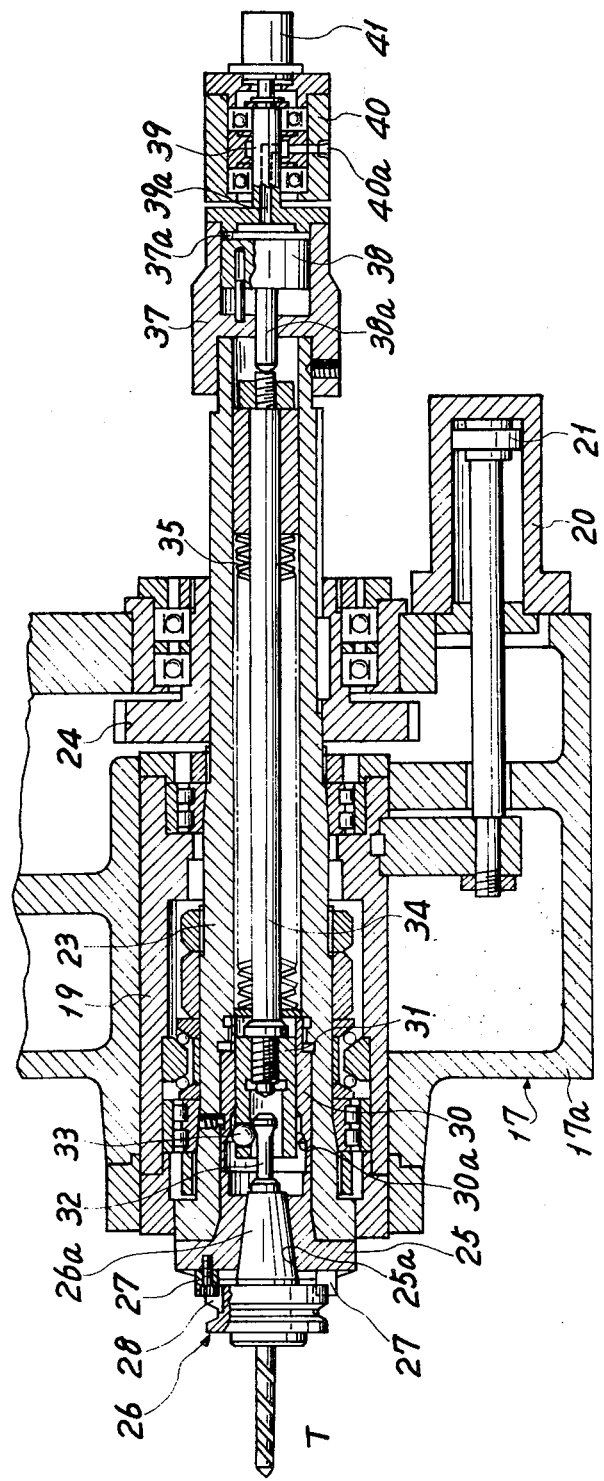

MACHINE TOOL WITH AUTOMATIC TOOL CHANGING DEVICE

BACKGROUND OF THE INVENTION

The present invention relates generally to machine tools and more particularly to a machine tool having an improved automatic tool changing device.

In conventional machine tools having an automatic tool changing device, a plurality of tools, which are respectively held within tool holders, are carried by a tool magazine, whereupon one of the tools may be transferred to and set within a drive spindle of the machine tool by the automatic tool change device in accordance with a required machining operation to be performed upon a workpiece.

In order to transmit the driving torque of the drive spindle to the tool, a drive key is usually provided upon the front end of the drive spindle, and each of the tool holders respectively has a pair of recesses upon each of the flanged portions thereof. Thus, the recesses upon the tool holder must be securely engaged with the drive key upon the drive spindle when the tool supported by the tool holder is set within the drive spindle, or in other words, when a tool changing operation is performed.

In such conventional machine tools having automatic tool changing apparatus, it was therefore required that the tools or tool holders be mounted upon a tool magazine at a predetermined angular position in accordance with the angular position of the recesses upon the tool holders, and that the drive spindle be stopped at a predetermined angular position when the tool changing operation is to be performed. Thus, the machine operation was complicated, and furthermore, the automatic tool changing time was prolonged because the rotational speed of the drive spindle had to be slowed down so as to be stopped at the predetermined angular position or otherwise the braking operation of the drive spindle could not be performed rapidly enough so as to attain the exchanging operation.

SUMMARY OF THE INVENTION

Accordingly, it is an object of the present invention to provide a machine tool with an improved automatic tool changing device by which the tool changing operation accompanied by the key-engagement operation is satisfactorily performed even when the drive spindle of the spindle head is stopped at any rotational or angular position.

Another object of the present invention is to provide a machine tool having an improved tool changing device for performing the tool changing operation within a short period of time.

The foregoing and other objects are obtained in accordance with the present invention through the provision of a machine tool having an automatic tool changing device, in which there is included a bed, workpiece supporting means mounted upon the bed and movable by motor means, a column slidably supporting spindle head means which rotatably supports a drive spindle having first engagement means for driving cutting tool means mounted thereon, tool magazine means for supporting a plurality of tool holders securely holding the cutting tool means, the same being capable of indexing each of the tool holders and cutting tool means thereon to a predetermined position where a tool changing operation is to be performed, each of the tool holders respectively having second engagement means being engagable with the first engagement means on the drive spindle, tool changing means for exchanging one of the cutting tool means mounted upon the tool magazine means and indexed at the predetermined position with cutting tool means mounted upon the spindle, first detecting means connected with the drive spindle for detecting a first angular position of the first engagement means upon the drive spindle when stopped by means of a brake means, second detecting means for detecting a second angular position of the second engagement means upon the tool holder indexed to the predetermined position, first control means responsive to output signals of the first and second detecting means and serving to generate an output signal corresponding to the differential between the first and second angular positions, and second control means, for rotating one of the tool holders upon the tool magazine means positioned at the predetermined position and the drive spindle, responsive to the output signal of the first control means so as to coincide the first and second angular positions, whereby the tool exchanging operation can be performed through engagement of the first and second engagement means.

BRIEF DESCRIPTION OF THE DRAWINGS

Various other objects, features and attendant advantages of the present invention will be more fully sppreciated as the same becomes better understood from the following detailed description when considered in connection with the accompanying drawings in which like reference characters designate like or corresponding parts throughout the several views, and wherein:

FIG. 2 is a cross section view of the spindle head, taken along the line II—II of FIG. 1;

DETAILED DESCRIPTION OF THE PREFERRED EMBODIMENT

Figure 1:
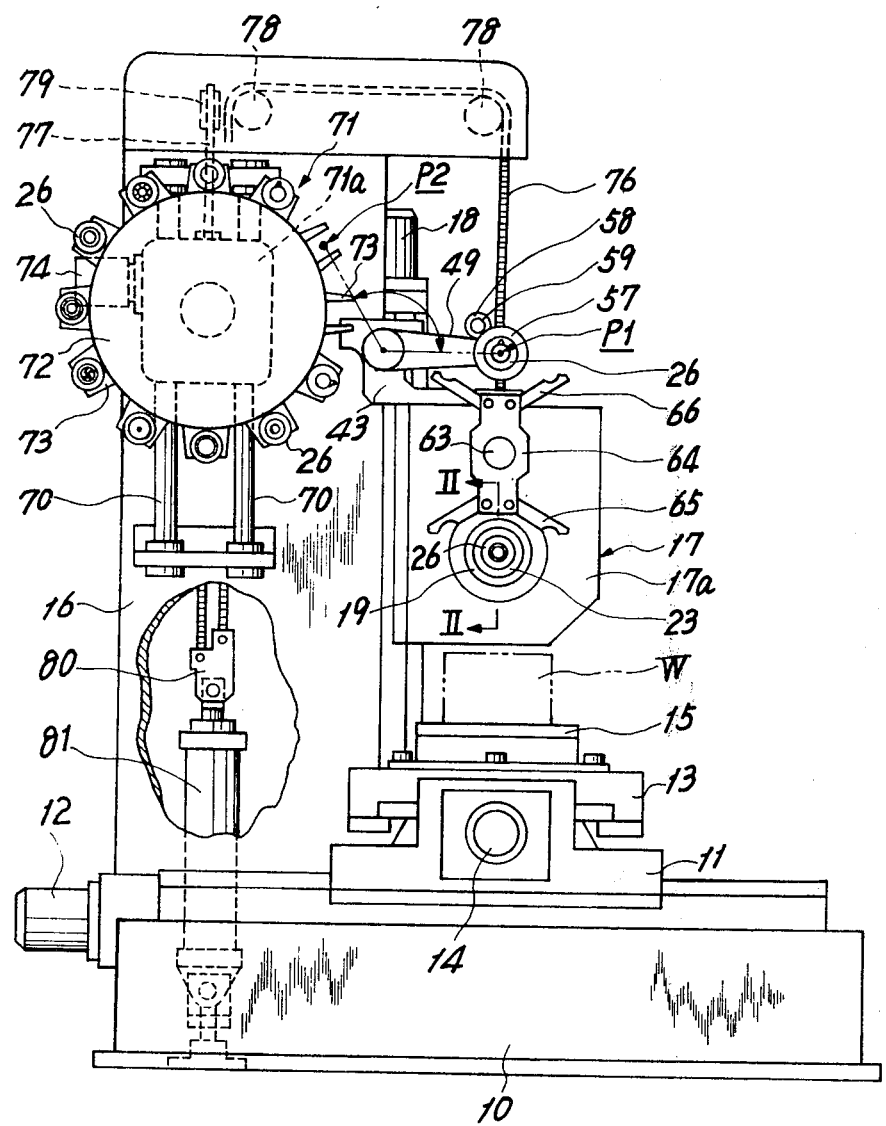
FIG. 1 is a front view, partly in section, of a machine tool having an automatic tool changing device constructed according to the present invention.

Referring now to the drawings, and more particularly to FIG. 1 thereof, there is shown a machine tool having a bed 10, the upper surface of which has slide ways or rails upon which a saddle 11 is slidably mounted for movement in a longitudinal direction. The saddle 11 is driven by means of a well-known electro-hydraulic stepping motor 12 secured upon the bed 10 through means of a gear transmission mechanism and a feed screw, not shown, which is engaged with the saddle 11. Upon slide ways or rails of the saddle 11 there is mounted a cross slide 13 which is slidably movable in a transverse direction and which is similarly controlled by means of an electro-hydraulic stepping motor 14 through means of a gear transmission mechanism and a feed screw, also not shown. A turntable 15 is rotatably mounted upon the cross slide 13 and is rotated or indexed by means of another stepping motor, not shown, mounted upon the cross slide 13, a workpiece W being mounted upon the turntable 15. Upon the rear side of bed 10, there is integrally provided a column 16, a vertically slidable spindle head 17 being mounted upon one side of the column 16 and being movable therealong by means of an electro-hydraulic stepping motor 18 which is also mounted upon column 16.

As shown in FIG. 2, a ram 19, slidably mounted within a bore which is provided within the base body 17a of the spindle head 17 is axially movable by means of cylinder and piston devices 20 and 21 which are also mounted upon an end of the base body 17a, the devices 20 and 21 serving to position the ram 19 at two predetermined axial positions in accordance with the required machining operation to be performed upon the workpiece W. Within the ram 19, there is provided a spindle 23 which is rotatably supported by means of ball and roller bearings which serve to prevent axial movement of the spindle 23 relative to the ram 19. A drive gear 24 is coaxially secured to the spindle 23 and is driven by means of a spindle drive motor having a braking apparatus, not shown, connected thereto.

Upon the front end of the spindle 23, there is secured a spindle adaptor 25, which has a tapered socket 25a, and a pair of drive keys 27 which are disposed upon diametrically opposed portions of the end surface of adaptor 25. A tool holder 26, which is adaptable so as to be able to hold any kind of tool has a pair of recesses 28 upon a flanged portion thereon for engagement with keys 27, and a tapered shank 26a formed at one side thereof which is seated within socket 25a, a draw bolt 32 extending therefrom. Thus, a tool T and the holder 26 can be driven by means of the drive spindle 23 through means of the drive keys 27 and a drive key engagement mechanism which will be more precisely described hereinafter.

Coaxially secured within the spindle 23 is a metal guide 30 in which is mounted an axiallyslidable sleeve 31, a plurality of balls, only one ball 33 of which is shown, being supported therein. The balls are radially movable so as to be engageable with a draw bolt 32 when the sleeve 31 is moved toward the right as viewed in FIG. 2, and consequently, the balls 33 are moved radially inwardly relative to the sleeve 31 by means of a cam surface 30a which is formed upon the inner surface of guide 30. Within the right end portion of the sleeve 31 there is a threaded draw rod 34 which is tensioned toward the right as seen in FIG. 2 by means of a coaxial coil spring 35 provided within the spindle 23, the tension force serving to resiliently support the tool holder 26 within the spindle adaptor 25 through means of rod 34, sleeve 31, and balls 33 which engage a head portion of draw bolt 32.

Upon the rear end of the spindle 23, there is secured a cylinder 37 in which a piston 38 is slidably fitted, the end of a piston rod 38a which extends therefrom contacting the other or right end of the draw rod 34. A rod 39 extends from the right end of the cylinder 37 and is coaxially mounted relative thereto as well as the spindle 23. The rod 39 is rotatably and sealingly fitted within a pressurized fluid distributor 40 which is secured upon the body 17a of the spindle head 17, the pressurized fluid being introduced within the cylindrical chamber 37a through an axial passage 39a for moving the draw rod 34 toward the left against the force exerted by means of the engagement of the balls 33 and the bolt 32 when it is desired to release the tool T and exchange the tool holder 26.

Upon the right end of the distributor 40, a well-known synchrogenerator 41 is mounted for connection with the rod 39, the particular synchrogenerator 41 being any one of the well-known synchro-generators, such as for example, "SELSYN," produced by General Electric, U.S.A. or the like, the construction including a rotor and a stator and means which generates an output proportional to the angular difference between the rotor and the stator. The angular position of the spindle 23 can therefore be detected by the synchrogenerator 41, the purpose of which will be more fully explained hereinafter.

Figure 4:
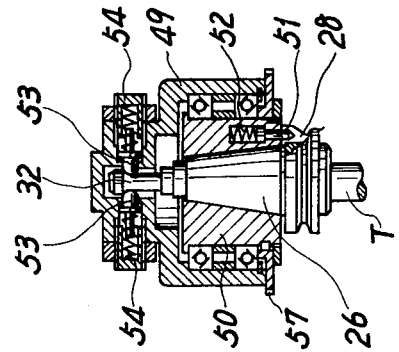
FIG. 4 is a cross section view of the arm assembly along the line IV—IV of FIG. 3.
Figure 3:
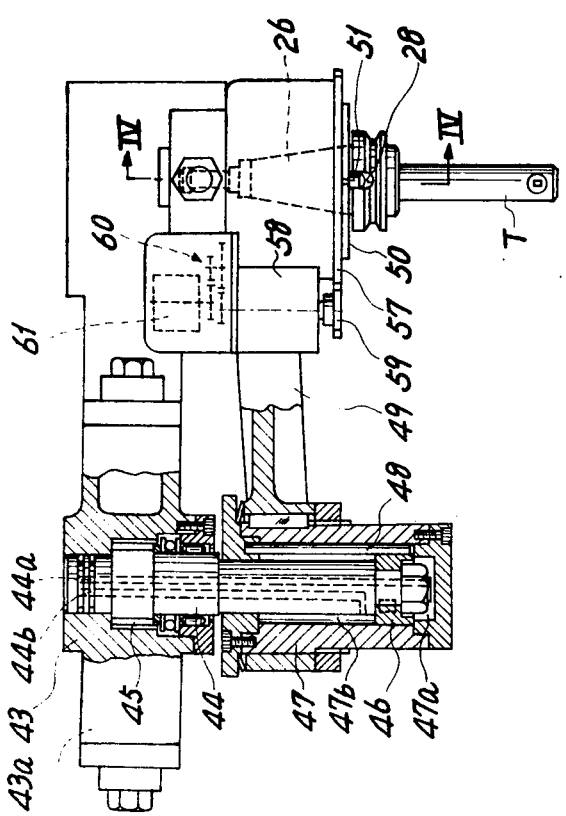
FIG. 3 is a plan view, partly in section, of the arm assembly of FIG. 1.

Referring now to FIGS. 1, 3 and 4, an arm 49 is mounted upon the spindle head 17 by means of a bracket 43, an arm supporting shaft 44 being rotatably supported within bracket 43. Upon the rear side of shaft 44, a pinion 45 is coaxially formed so as to engage with a rack, not shown, which is slidably supported upon the bracket 43 and is moved by means of a cylindrical device 43a in a direction transverse to the axis of the shaft 44. Upon the front end of the shaft 44 there is mounted a piston 46 which is fitted within a cylinder 47, a guide bar 48, provided within the cylinder 47, serving to move the same in an axial direction only. The arm 49 is securedly mounted upon the cylinder 47 and a socket 50 is rotatably mounted upon the end of the arm 49.

Within socket 50 there is provided a plunger 51 which is axially slidable and which is resiliently mounted by means of a compressive spring 52 which is provided within the blind hole supporting the plunger 51. Thus, the plunger 51 can engage with the recess 28 upon the tool holder 26 when the tool holder 26 is inserted within the socket 50 and thereafter, the socket 50 can be rotated with the tool holder 26. By the engagement of the plunger 51 and the recess 28, the tool holder 26 and recess 28 can be positioned in a predetermined angular relationship relative to the socket 50. A pair of radially movable holding pins 53 are provided within the arm 49, a pair of compressive springs 54 also mounted within the arm 49 serving to bias the holding pins in a direction toward the axis of the socket 50. The holding pins 53 engage with the draw bolt 32 of the tool holder 26 and serve to retain the tool holder 26 within the socket 50.

Upon the front end of the socket 50 there is provided a gear 57 coaxially secured thereto. A D.C. servo-motor 58 is mounted upon the arm 49 and a pinion 59, which is fixed upon one side of the rotor shaft of the motor 58, is engaged with the gear 57. The other end of the rotor shaft is connected to a synchro-receiver 61, which has a similar construction as that of the synchrogenerator 41, through means of a gear transmission mechanism 60. The rotor of the synchro-generator 41 can thus rotate at the same rotational speed as that of the socket 50 by means of the gear transmission mechanism 60. Hence, the synchro-receiver 61 can generate an output proportional to the rotational position of the socket 50, or in other words, an output proportional to the angular position of the recess 28 upon the tool holder 26 which is supported within the socket 50, the plunger 51 being engaged with the recess 28.

The arm 49 can be stationed at two angular positions by means of actuation of the cylindrical device 43a. One position is a tool exchange position P1 as shown in FIG. 1. In the instance that the arm 49 is indexed to this position P1, a primary tool changing arm, discussed in detail hereinafter, can change the tools upon the spindle adapter 25 and the socket 50. Another position is the position P2 wherein the tool upon arm 49 can be returned to a tool magazine 71 while another tool upon the magazine 71 can be loaded upon the socket 50 as a result of the actuation of the piston and cylinder mechanism 46 and 47 connected to the arm 49.

As shown in FIG. 1, the primary tool exchanging arm 64 is securely mounted upon one end of a shaft 63 which is rotatably and slidably supported by the body 17a of the spindle head 17, the shaft 63 being moved in a rotational and axial direction respectively by means of rotational and axial actuators, not shown, provided upon the spindle head 17. Both ends of the arm 64 have a pair of fingers 65 and 66 for gripping and releasing the tool holders 26, each pair of fingers being actuated by means of a pair of pressurized fluid actuators, not shown, mounted within the arm 64. The operation of exchanging the tools mounted upon the arm 49 and the spindle 23 can be performed by the axial movement and rotation of the primary arm 64.

The tool magazine 71 is reciprocably guided by means of a pair of pilot bars 70 which are vertically mounted upon the front side of the column 16. Upon the base body 71a of the magazine 71 there is rotatably mounted a turntable 72 and upon the periphery thereof a plurality of equidistantly spaced tool gripping means 73 are provided. The magazine motor 74, which is also mounted upon the base body 71a, serves to index the turntable 72 so as to position a desired tool at the tool loading station P2 for the performance of a particular machining operation. In addition, it should be noted that the tool gripping means 73 indexed to the position P2 is capable of being released by means of a suitable releasing mechanism, and thereafter the tool exchange operation between the magazine 71 and the arm 49 is able to be performed.

Upon the upper ends of the spindle head 17 and the tool magazine 71, there is provided chain and sprocket assemblies 76 and 78, and 77 and 79, respectively, the lower ends of the chains 76 and 77 being connected to a connecting block 80 which is pivotally connected to a counterbalancing cylinder 81 for counterbalancing the weight of the spindle head 17 and the tool magazine 71. Thus, the tool magazine 71 follows the spindle head 17 when the spindle head is moved by means of the motor 18, and therefore the mutual relationship between the tool magazine 71 and the arm 49 always remains the same. The detailed structure of the above-noted magazine following mechanism is disclosed in the Japanese Pat. Publication No. 46-39985, Japanese Pat. No. 648,210.

Figure 5:
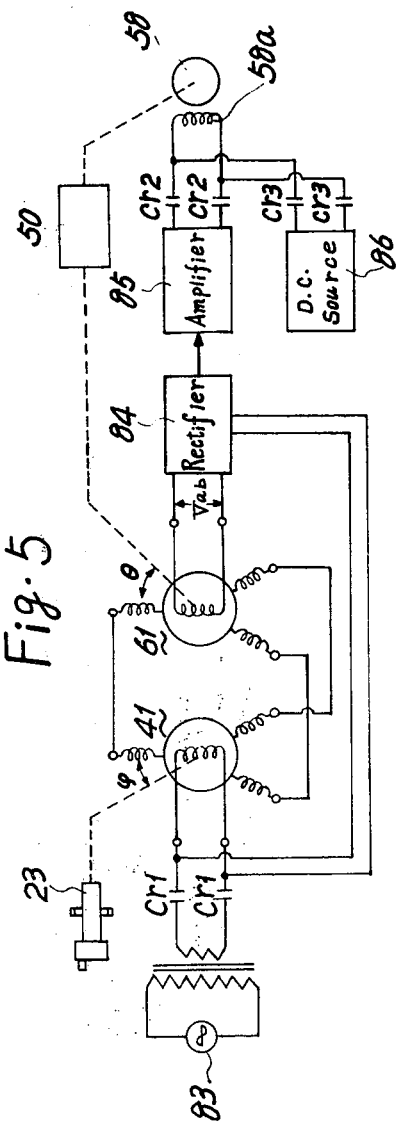
FIG. 5 schematically shows a control circuit for performing the tool changing operation of the present invention.

Referring now to FIG. 5, the control circuit for positioning the key 27 for engaging the recess 28 upon the tool holder 26 is shown as including an A.C. power source 83 which provides A.C. current to the rotor of the synchrogenerator 41 through a transformer, and a pair of normally opened contacts $Cr1$. As noted above, the rotor of the generator 41 is rotated so as to correspond with the rotation of the spindle 23, while the stator of the generator 41 is connected in parallel, to the stator of the synchro-receiver 61. The rotor of the receiver 61 is rotated by means of the D.C. servo-motor 58 which simultaneously drives the socket 50 within the arm 49, and the output terminals of the rotor of the receiver 61 are connected to the input terminals of a rectifier 84. It should be noted that the angles $\phi$ and $\theta$ of the rotors, relative to the stators, of the generator 41 and the receiver 61 are adjusted so that they are equal when the angular position of the key 27 upon the spindle adapter 25 is coincident with the angular position of the plunger 51 upon the socket 50 at the tool changing position P1.

The output signal of the rectifier 84 is amplified by means of an amplifier 85 and the output signal thereof is given to a driving coil 58a of the D.C. servomotor 58 through means of a pair of normally open contacts $Cr2$. A D.C. power source 86 is also provided and the output terminals thereof are also connected to the coil 58a through another pair of normally open contacts $Cr3$. The contacts $Cr1, Cr2, Cr3$ are controlled so as to close by means of relays, not shown, which may be energized by means of a numerical controller or the like. When the contacts $Cr1$ are closed, the output voltage $Vab$ of the rotor of the synchroreceiver 61 is as follows:

$$Vab = K \cdot V \cdot \sin(\omega \cdot t + \alpha) \cdot \sin(\phi - \theta)$$

wherein:
$\alpha, K$: constants
$V$: maximum voltage of the A.C. source
$\omega$: angular frequency (rad./sec.)
$t$: time (sec.)

Therefore, when the contacts $Cr2$ are closed, the D.C. servo-motor 58 is actuated until the angle $\theta$ is equalized with the angle $\phi$.

In the following explanation dealing with the operation of the present invention, it is assumed that a first tool for a particular machining operation has been transferred from the tool magazine 71 to the tool changing position P1 by means of the arm 49 and that the tool has been securely mounted upon the spindle adaptor 25 by means of the key engagement mechanism, and further, that the socket 50 upon the arm 49 is empty.

While the tool upon the spindle head 17 machines the workpiece W by means of appropriate control of the movements of the saddle 11, the cross-slide 13 and the spindle head 17, the tool magazine is indexed by the motor 74 so that a tool to be utilized for the next machining operation is positioned at the tool loading position P2. At the same time, the arm 49 is axially moved in a rearward direction as shown in FIG. 3 by the application of pressurized fluid to the cylindrical chamber 47b through the passage 44b and is thereafter rotated from the position P1 to the position P2 by the actuation of the cylindrical device 43a, that is, the socket 50 upon the arm 49 is positioned to the rear of the tool or tool holder 26 to be used in the next operation.

The arm 49 and the socket 50 thereon are subsequently axially moved by supplying fluid under pressure to the cylindrical chamber 47a through passage 44a, and therefore, the socket 50 receives the tapered shank 26a of the tool holder 26 which is indexed at the position P2. Normally, the plunger 51 supported within the socket 50 does not engage the recess 28 upon the tool holder 26 under this situation, and thus, the plunger 51 is pressed into the socket 50 against the compressive force of the spring 52 by means of the flanged portion of the tool holder 26.

After the foregoing operation, the contacts $Cr3$ are controlled so as to close, and thus, the D.C. servomotor 58 is connected with the D.C. source 86 and is consequently driven at a constant relatively slow speed. Since the tool holder 26 is securely grasped by means of the gripping means 73, the motor 58 is rotated in conjunction with the socket 50 and the plunger 51, while the tool holder 26 remains stationary. Therefore, the plunger 51 can be engaged with one of the recessed 28 upon the tool holder 26 by means of the force of the spring 52 when the socket 50 is rotated through an angle of at least 180°. It is noted that the closing time of the contacts $Cr3$ is controlled, for example, by means of timer, not shown, so that the motor 58 is rotated approximately one revolution.

When the servo-motor 58 is stopped due to the opening of the contacts $Cr3$, which occurs at the end of the particular time cycle set upon the timer, the gripping means 73 positioned at P2 is released and the tool holder 26 is permitted to be removed therefrom. Following such operation, the arm 49 is rotated in a clockwise direction, and the tool and tool holder 26 are moved to and retained at the position P1 till the next tool exchanging operation is to be performed.

Thereafter, when a particular machining operation upon the workpiece W is completed, the spindle 23 is rapidly stopped by a suitable braking device, not shown. The angular position of the spindle 23 is therefore not the same when stopped at the conclusion of each machining operation. The contacts $Cr1$ and $Cr2$ are then closed, and thus, the rotor of the synchro-receiver 61 generates an output signal corresponding to the difference between the angle $\phi$ and the angle $\theta$. Accordingly, the socket 50 is rotated by this output signal until the angle $\theta$ thereof is equalized with the angle $\phi$ of the spindle 23, and is then stopped.

Subsequently, the fingers 65 and 66 upon the primary arm 64 are closed by means of an actuator, not shown, so as to grip the flanged portions of the tool holders 26 upon the spindle 23 and the socket 50. Thereafter, pressurized fluid is supplied to the cylindrical chamber 37a of the cylinder 37 upon the rear end of the spindle 23 for moving the piston 38 toward the left as seen in FIG. 2. The movement of the piston 38 causes the draw rod 34 to move against the compressive force of the spring 35, and the engagement between the balls 33 and the drawbolt 32 is released so that the tool holder 26 can be removed from the spindle adapter 25. The primary arm 64 may then be axially advanced and thereafter rotated through 180° and be axially retracted.

In consequence of such operation, the tool to be utilized for the next operation may be inserted within spindle adaptor 25 through the appropriate engagement of the recesses 28 of the tool holder 26 and the keys 27 upon the spindle adaptor 25, while the previously utilized tool is placed within the socket 50. Since the application of pressurized fluid within the cylindrical chamber 37a is terminated, the draw rod 34, sleeve 31, and balls 33 are moved toward the right as seen in FIG. 2 under the influence of the spring 35, and consequently, the new tool holder 26 is clamped upon the spindle adaptor 25, at the conclusion of which, the fingers 65 and 66 may be opened.

While this tool exchanging operation is being performed, the magazine 71 is rotated by means of the motor 74 for indexing one of the tool gripping means 73, within which the tool utilized in the previous machining operation is to be held, to the position P2. After the opening of the fingers 65 and 66, the arm 49 is axially advanced, by means of the distribution of the pressurized fluid to the cylindrical chamber 47a of the cylinder 47, and then rotated to the position P2, by means of the actuation of the cylinder 43a, for mounting the tool holder 26 supported by the socket 50 upon the gripping means 73. The gripping means 73 is controlled to securely grip the tool holder 26 and thereafter, the arm 49 is retracted by the application of the pressurized fluid into the cylindrical chamber 47a, the tool holder 26 being removed from the socket 50.

The motor 74 may then be energized so as to index the tool magazine 71 and a particular tool to be used in a further machining operation at the position P2. The arm 49 may then be positioned at P2 and the rear end thereof may be controlled so as to advance the same whereby the tool holder 26 at P2 is placed within the socket 50. Thereafter, the tool exchanging operation may be performed as described above.

Obviously, many modifications and variations of the present invention are possible in light of the above teachings. For example, in a machine tool in which only the primary arm serves to exchange the tools upon the tool magazine and the spindle head, the tool holder indexing means having a D.C. servo-motor 58, socket 50, and synchro-generator 61, may be mounted upon the column 16 or spindle head 17 for indexing the tool to be exchanged in accordance with the angular position of the stopped spindle. It is therefore to be understood that within the scope of the appended claims, the invention may be practiced otherwise than as specifically described herein.

I claim:

1. A machine tool having an automatic tool changing device comprising:

a bed;

workpiece supporting means movably mounted upon said bed and moved by motor means;

a column mounted upon said bed for slidably supporting spindle head means, said spindle head means rotatably supporting a drive spindle having first engagement means including one of a key means and a recess means for driving a tool holder carrying cutting tool means mounted upon said drive spindle;

tool magazine means mounted upon said column for supporting a plurality of said tool holders securely holding said cutting tool means and means for indexing said magazine to position a preselected one of said tool holders and said cutting tool means thereon to a predetermined position when a tool changing operation is to be performed, said tool holders respectively having second engagement means including the other of said key means and recess means being engageable with said first engagement means upon said drive spindle;

arm means for removing and replacing said holder carrying said cutting tool means from said tool magazine;

primary arm means for exchanging said holder carrying said cutting tool means upon said arm means for said holder carrying said cutting tool means within said drive spindle;

first detecting means connected with said drive spindle for detecting a first angular position of said first engagement means upon said drive spindle;

second detecting means for detecting a second angular position of said second engagement means upon said tool holder while held upon said arm means;

first control means, responsive to the outputs of said first and second detecting means, serving to generate an output signal corresponding to the differential between said first angular position and said second angular position; and second control means for rotating one of said drive spindle and said tool holder held by said arm means that is to be exchanged for a tool holder mounted on said drive spindle, responsive to said output signal of said first control means so as to prealign said first and second angular positions, whereby when said primary arm means interchanges said tool holder from said arm means to said spindle said first and second engagement means are coincident.

2. A machine tool as set forth in claim 1, wherein said arm means comprises an arm, actuating means connected with said arm for rotating and moving said arm in a direction parallel to the axis of said cutting tool means mounted upon said tool magazine, a socket rotatably mounted upon said arm and removably holding said tool holder, and a plunger provided upon said socket which is movable in an axial direction of said socket for engaging with said second engagement means upon said tool holder placed within said socket.

3. A machine tool as set forth in claim 2, wherein said second control means is a servo-motor mounted upon said arm for rotating said socket, and said second detecting means detects the angular position of said socket wherein said angular position of said socket defines said second angular position.

4. A machine tool as set forth in claim 3, wherein said second control means includes a power source and switching means for selectively supplying an electrical power output of said power source to said servo-motor so as to rotate said control means at a constant speed.

5. A machine tool as set forth in claim 4, wherein said first and second detecting means are synchro-generators.

* * * * *